United States Patent [19]
Robinson

[11] Patent Number: 5,720,696
[45] Date of Patent: Feb. 24, 1998

[54] METHOD OF SHIFT CONTROL USING MOMENT OF INERTIA ESTIMATION

[75] Inventor: Timothy Alan Robinson, Indianapolis, Ind.

[73] Assignee: General Motors Corporation, Detroit, Mich.

[21] Appl. No.: 635,185

[22] Filed: Apr. 25, 1996

[51] Int. Cl.$^6$ .......................... B60K 41/00; F16H 59/14
[52] U.S. Cl. ........................................ 477/120; 477/904
[58] Field of Search .............................. 477/120, 121, 477/151, 154, 156, 904; 74/335

[56] References Cited

U.S. PATENT DOCUMENTS

| | | | |
|---|---|---|---|
| 5,241,476 | 8/1993 | Benford et al. | 477/120 X |
| 5,462,500 | 10/1995 | Benford et al. | 477/154 |
| 5,487,005 | 1/1996 | Genise | 477/120 X |
| 5,490,063 | 2/1996 | Genise | 477/120 X |
| 5,568,748 | 10/1996 | Carlson et al. | 477/120 X |
| 5,620,392 | 4/1997 | Genise | 477/904 X |

*Primary Examiner*—Khoi Q. Ta
*Attorney, Agent, or Firm*—Vincent A. Cichosz

[57] ABSTRACT

In a motor vehicle having an electronically controlled automatic transmission, a method of inhibiting upshifts determines torque and acceleration parameters of the output shaft of the transmission prior to and after a shift. An estimate of the output shaft moment of inertia is determined from the pre and post shift quantities and used in the inhibition of upshifts having inadequate torque capacity.

8 Claims, 5 Drawing Sheets

METHOD OF SHIFT CONTROL USING MOMENT OF INERTIA ESTIMATION

BACKGROUND

The present invention relates to a method of controlling a shift in an automatic transmission, and more particularly to the inhibition of an upshift when the acceleration in the next higher gear may be limited.

Generally, a motor vehicle automatic transmission includes a number of gear elements coupling its input and output shafts, and a related number of torque transmitting devices such as clutches and brakes which are selectively engageable to activate certain gear elements for establishing a desired speed ratio between the input and output shafts in accord with a predetermined shift pattern. The brake can be of the band type or disc type; those skilled in the art refer to disc type brakes in transmissions as clutches or reaction clutches. As used herein, the terms clutches and torque transmitting devices may be used interchangeably and refer to brakes as well as clutches.

The input shaft is connected to the vehicle engine through a fluid coupling, such as a torque converter, and the output shaft is coupled directly to the vehicle wheels. Shifting from one forward speed ratio to another is performed in response to and engine load parameter, typically throttle position, and vehicle speed or other output speed quantity and generally involves releasing or disengaging the clutch (oft-going) associated with the current speed ratio and applying or engaging the clutch (on-coming) associated with the desired speed ratio. The speed ratio is defined as the transmission input speed or turbine speed divided by the output speed. Thus, a low gear has a high speed ratio while a higher gear has a lower speed ratio. To perform an upshift, for example, a shift is made from a high speed ratio to a low speed ratio.

Shift scheduling is typically performed by reference to engine throttle and output speed parameters. For example, a table look-up may be performed with throttle position as the independent variable to return a threshold value of output speed. Actual output speed may then be compared with the look-up value which, if exceeded, indicates the desirability of performing an upshift to the next higher gear. Downshifts are performed in an analogous manner. Hysteresis in the shift scheduling provides stability. Table data as is often employed is developed from empirical testing and generally reflects a compromise among competing concerns including performance, fuel economy, and pleaseability of shift feel. Additionally, such calibrations generally reflect a single vehicle load condition. That is to say, vehicle mass is assumed constant at some predetermined level and operating grade or slope is assumed to be only nominal.

Those skilled in the art have recognized that introducing mass to the vehicle in terms of direct cargo payload or trailering and towing payload changes the response of a simple load vs. output speed based shift scheduling. Also, it has been recognized that introducing a grade to the operating environment of the motor vehicle may have a similar effect upon such shift scheduling techniques. Increases in vehicle loading will tend to manifest in increased engine load for a given output speed. Therefore, frequent shifting may occur between adjacent gears when the vehicle is operating at load conditions which may cause upshifts into a gear not able to maintain vehicle speed or have sufficient excess torque to accelerate the vehicle further. Consequently, the upshift is followed soon thereafter by a downshift. Such shift cycling or shift busyness apart from being annoying may have deleterious wear effects upon the transmission friction elements.

Improved methods of controlling vehicle shifting have been proposed to address these recognized problems. For example, U.S. Pat. No. 5,172,609 to Nitz et al. and assigned to Saturn Corporation discloses a method of removing speed ratios from the shift pattern where it is determined that such speed ratios have insufficient excess gradeability in relation to the actual grade load on the vehicle. In this reference, grade load is continually calculated as a function of drive axle torque, torque required to accelerate the vehicle, and torques required to overcome aerodynamic drag and rolling resistance of the vehicle. Such calculations tend to be relatively processor intensive and subject to variations in the calculated value of grade load due to the temporal nature of road surface grades and more infinitesimal variations affecting rolling resistance, and headwinds and crosswinds affecting aerodynamic drag.

SUMMARY

Therefore, the present invention is directed toward a method of shift control which adapts the normal shift scheduling to prevent up-shifting to a gear having inadequate torque capacity. The present invention is embodied in a motor vehicle powertrain having an internal combustion engine, multi-ratio automatic transmission and a torque transmitting fluid coupling therebetween such as a conventional torque converter.

Accordingly, the present invention calculates the moment of inertia at the transmission output member from respective sets of transmission output member parameters determined prior to and after a ratio change. The ratio change generally ensures output member parameter differentials are sufficiently large to render accurate inertia estimates. Likewise, typical shift durations are short enough that temporal load torque influences may be considered constant thus factoring out of the calculations. Shift scheduling may then be adapted as a predetermined function of the moment of inertia.

Particularly, transmission output shaft acceleration immediately preceding a ratio change is determined as is output torque of the output shaft. After completion of the shift, transmission output shaft acceleration and torque are again determined. The moment of inertia at the transmission output member is then determined as a function of pre and post shift accelerations and torques. Future upshifts are then authorized as a predetermined function of the moment of inertia.

BRIEF DESCRIPTION OF THE DRAWINGS

The present invention will now be described, by way of example, with reference to the accompanying drawings, in which.

DETAILED DESCRIPTION OF THE INVENTION

Referring now to the drawings, and more particularly to FIG. 1a, the reference numeral 10 generally designates a motor vehicle drive train including a fuel throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gear set is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement, require a fill time before torque is transmitted between a driving and a driven friction element.

The speed and torque relationships between the engine 12 and the drive wheels of the vehicle are controlled by a fluid operated torque converter clutch, designed TCC, and five fluid operated transmission clutches, designed C1–C5. The torque converter clutch TCC is selectively engaged by the solenoid operated control valve 30 to mechanically connect the impeller and turbine of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio or neutral. It will be noted that in neutral, the clutch C5 is engaged so that a shift can be made to reverse or the first forward range by applying clutch C3 or clutch C1, respectively. It is also apparent that a shift between forward and reverse requires only a release of one clutch and the application of one clutch. The illustrated transmission gear set provides one reverse ratio and six forward ratios, and is described in detail in the U.S. Pat. No. 4,070,927 to Polak, issued Jan. 31, 1978, and assigned to the assignee of the present invention.

Figure 1:
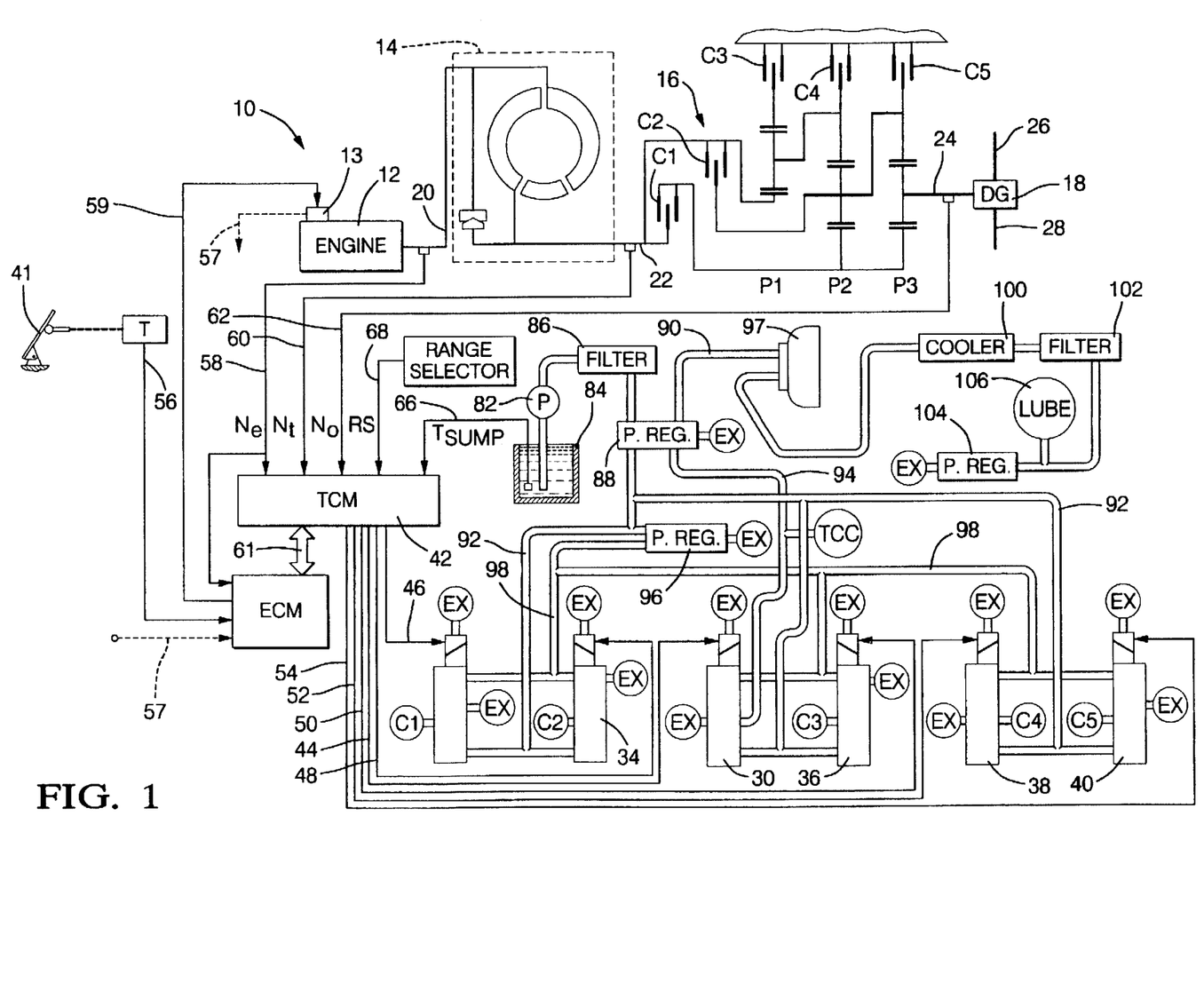
FIG. 1 is a system schematic of a fluid operated transmission including electronically controlled fluid valves, clutches, and computer control units (ECM and TCM) for carrying out the control of the present invention.

The operation of the solenoid operated control valves 30–40 is controlled by a computer-based transmission control module (TCM) 42 via lines 44–54 in response to various input signals representative of system parameters. Such inputs include an engine output shaft speed signal Ne on line 58, a torque converter output shaft speed signal Nt on line 60, a transmission output shaft speed signal No on line 62, a transmission fluid temperature signal Tsump on line 66, and an operator range selector position signal RS on line 68. The input signals are obtained with conventional electrical transducers such as potentiometers, thermistors and magnetic speed pickups or simple binary switch inputs such as may represent service brake application and release.

Internally, TCM 42 comprises a number of conventional devices including a microcomputer with internal clock and memory, an input-output section including A/D and D/A as required, and an array of PWM generators and drivers. The PWM outputs are delivered to respective drivers and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

Operation of the internal combustion engine 12 is controlled by a conventional computer-based engine control module (ECM) 64 in response to various input signals representative of system parameters, operator torque requests and TCM communicated data. Such inputs include an accelerator position signal on line 56, and an engine output shaft speed signal Ne on line 58. In addition to input signals on discrete lines, bi-directional data link 61 interfacing TCM 42 with ECM 64 provides ECM 64 with various engine torque and speed control data including control mode commands, device priority, and mode control data. Preferably, ECM 64 and TCM 42 communicate via a serial data link using Society of Automotive Engineers (SAE) J1939 data communication protocol. The operator manipulated accelerator pedal 41 position is conveyed through the accelerator position sensor 'T' for providing an operator torque request signal. The output of fuel throttled engine 12 is controlled in accord with the fuel metering signal on line 59 to fuel metering system 13. Fuel metering system 13 may be any of a variety of well known electronically or electromechanically controlled fuel metering systems, examples of which include electronically-governed in-line fuel-injection pump systems, electronically-governed distributor-type fuel-injection pump, or electronically controlled fuel-injector systems. A further input to ECM 64 may include a fuel metering system feedback signal on line 57 such as a rack-position sensor conventionally used in conjunction with an electronically-governed in-line fuel-injection pump system.

Alternatively, air-throttled internal combustion engines may be similarly employed with the control of the present invention. Using the same number designations, an air-throttled engine would include conventional air throttling system 13 including throttle plate and position sensor therefor. The position sensor, not separately shown, would provide a throttle position signal on line 57 in a conventional manner. Throttle opening would be controlled by throttle signal on line 59 controlling a conventional throttle plate actuator. Additionally, a spark-ignition internal combustion engine includes a spark-ignition system (not shown) including a conventional electronic spark timing unit to initiate combustion in accordance with a spark timing signal from ECM 64 and fuel injection apparatus (not shown) controlled in a well known manner by fueling pulse width signals also generated by the ECM 64.

Although illustrated with respect to implementation in a vehicle having a fuel throttled engine, the present invention is, as mentioned, applicable to any other variety of internal combustion engine including a conventional air-throttled spark-ignition engine. Similarly, the exemplary system shows electronically controlled throttle actuation; however, conventional mechanically actuated throttle control may be employed.

The hydraulic circuit of transmission 16 includes a positive displacement pump 82 for supplying pressurized hydraulic fluid from the sump or reservoir 84, to the clutches TCC and C1–C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30–40, and also to the control pressure regulator valve 96. The control pressure regulator valve 96 develops a some-what lower pressure in line 98, referred to herein as the control pressure, such pressure being directed to the solenoid of each control valve 30–40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lockup mode.

In accordance with the present invention, the relationship between the transmission output shaft acceleration and torque for a vehicle under constant load conditions is used to develop a measure of the moment of inertia at the output shaft of the transmission (hereafter output inertia). During shift scheduling, output inertia is used to predict output shaft acceleration for a predetermined engine load setting in the next higher gear should an upshift be implemented in accordance with a predetermined shift schedule. If it is then determined that the predicted acceleration is satisfactory, an upshift is allowed to proceed; otherwise, the upshift is inhibited.

When calculated under substantially steady state conditions with respect to road grade and wind resistance, the output inertia is a measure independent of such temporal vehicle load conditions and a measure of durable vehicle load conditions such as trailered loads or cargo loads.

The following relationship between output torque, acceleration and inertia quantities is assumed:

$$A = [(T_{out} - T_L)]/In \quad (1)$$

where A is the output acceleration, $T_{out}$ is the output shaft torque, $T_L$ is the summation of temporal torque loads due to grade, rolling resistance and wind resistance, and In is the output inertia.

Of these represented quantities, direct measurement of $T_L$ and In is not possible. By employing a pair of equations as (1) above, and employing data measured over a period with the condition that the loads and inertia remain constant, a pair of equations $$A_1 = [(T_{out1} - T_L)]/In \quad (2)$$

$$A_2 = [(T_{out2} - T_L)]/In \quad (3)$$

may be reduced and solved for the output inertia as follows:

$$In = (T_{out1} - T_{out2})/(A_1 - A_2) \quad (4)$$

As can be seen from an examination of the reduction as shown in (4), the temporal torque loads ($T_L$) cancel. Rearrangement of equation (4) above advantageously yields the equation:

$$A_2 = [(T_{out2} - T_{out1})/In] + A_1 \quad (5)$$

The present invention utilizes the relationships as derived in (4) and (5) in updating a measure of output inertia free from temporal influences and in controlling the shift scheduling of an automatic transmission in accordance with a predicted acceleration of the output shaft (i.e. $A_2$).

The temporal torque loads $T_L$ are assumed substantially steady in the present invention by minimizing separation in time of parameter measurements used in the necessary calculation and derivations. Torque differential and acceleration differential as embodied in formula (4) numerator and denominator, respectively, are preferably maximized to reduce errors otherwise incident upon differential data which is on the order of magnitude of measurement errors for any given system. Therefore, it is preferred to derive the various output torque and acceleration quantities $T_{out}$ and $A_i$ from powertrain quantities on opposite ends of a shift event. That is to say, the first set of torque and acceleration measurements ($T_{out1}, A_1$) are made prior to a shift event and the second set of torque and acceleration measurements ($T_{out2}, A_2$) are made subsequent the same shift event.

A determination is thereafter made with respect to the adequacy of the predicted output shaft acceleration in the upshift gear. The upshift then is either allowed to proceed as normal or is inhibited.

FIGS. 3–6 are flow diagrams representative of computer program instructions executed by the computer-based TCM 42 of FIG. 1 in carrying out the shift control technique of this invention. In the description of the flow diagrams other than FIG. 3, the functional explanation marked with numerals in angle brackets, <nn>, refers to blocks bearing that number.

Figure 3:
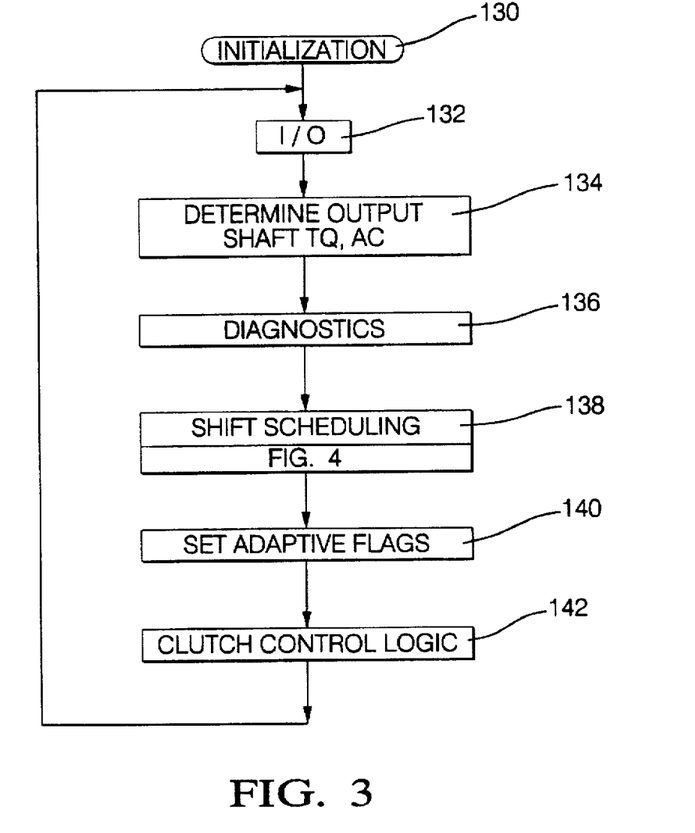
FIGS. 3–6 are flow diagrams representative of computer program instructions for executed by the TCM shown in FIG. 1 in carrying out the control of the present invention.

FIG. 3 represents an executive or main loop program which directs the sequential execution of various subroutines. Block 130 designates a series of instructions executed at the initiation of each period of vehicle operation for setting the various times, registers and variable values of control unit 42 to predetermined initial values. Thereafter, the blocks 132–142 are sequentially and repeatedly executed as indicated by the flow diagram lines. Block 132 reads the various input signal values and outputs the required control signals to the PWM generators and drivers for solenoid controlled valves 30–40. Block 134 contains logic for determining torque and acceleration quantities of the transmission output shaft for later use specifically with respect to the control technique of the present invention. Blocks 136–140 contain diagnostic, shift scheduling, and adaptive flag logic. The clutch control logic block 142 analyzes the various system input signals described above in reference to FIG. 1, develops pressure command signals for application to the solenoid operated control valves at the next execution of block 132, and computes adaptive corrections based on the adaptive flags at shift completion. Block 142 also effects pulse-width-modulation of the solenoid drive voltage to carry out the pressure commands for specific shift operations.

Figure 4:
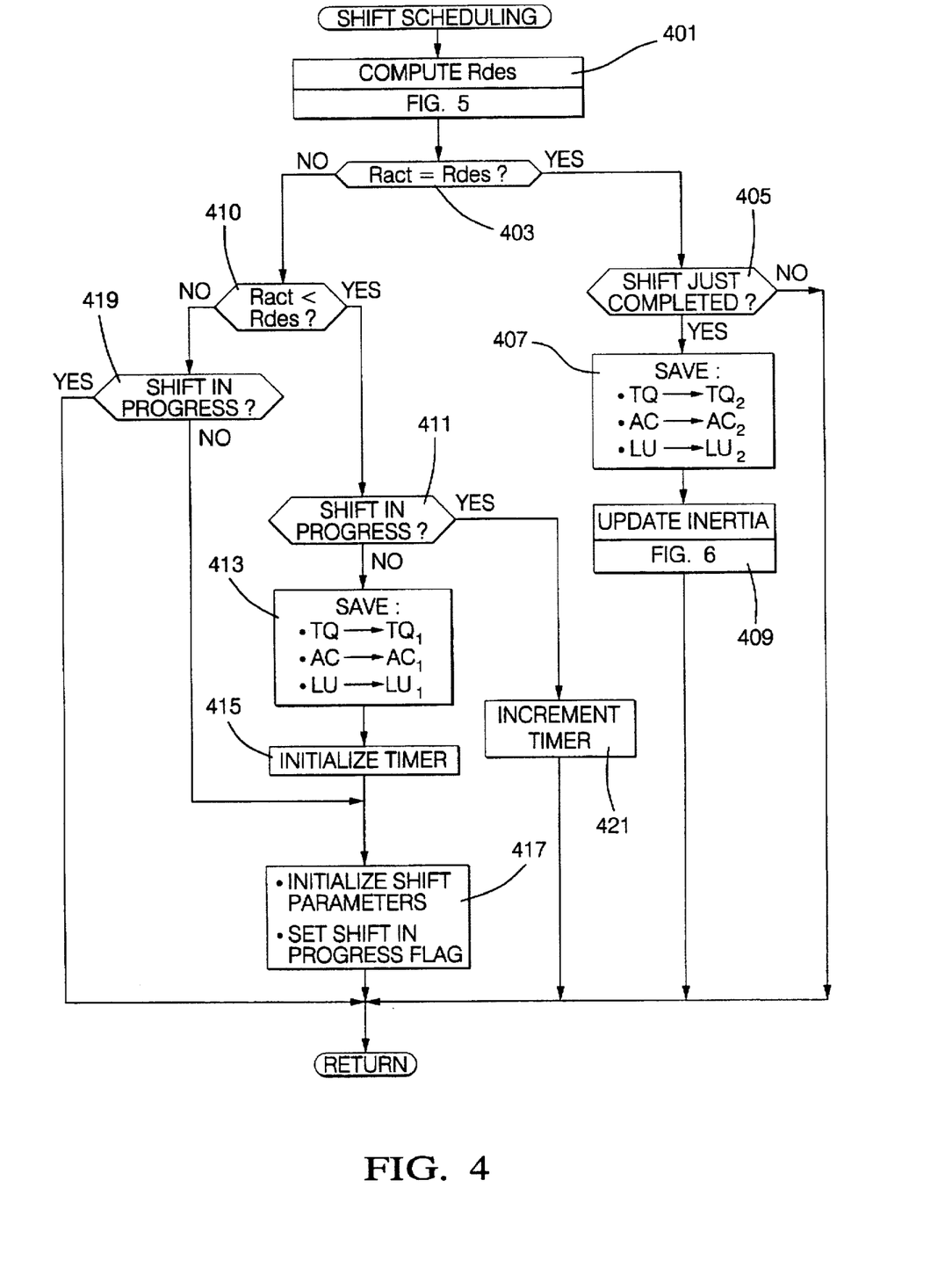
Figure 5:
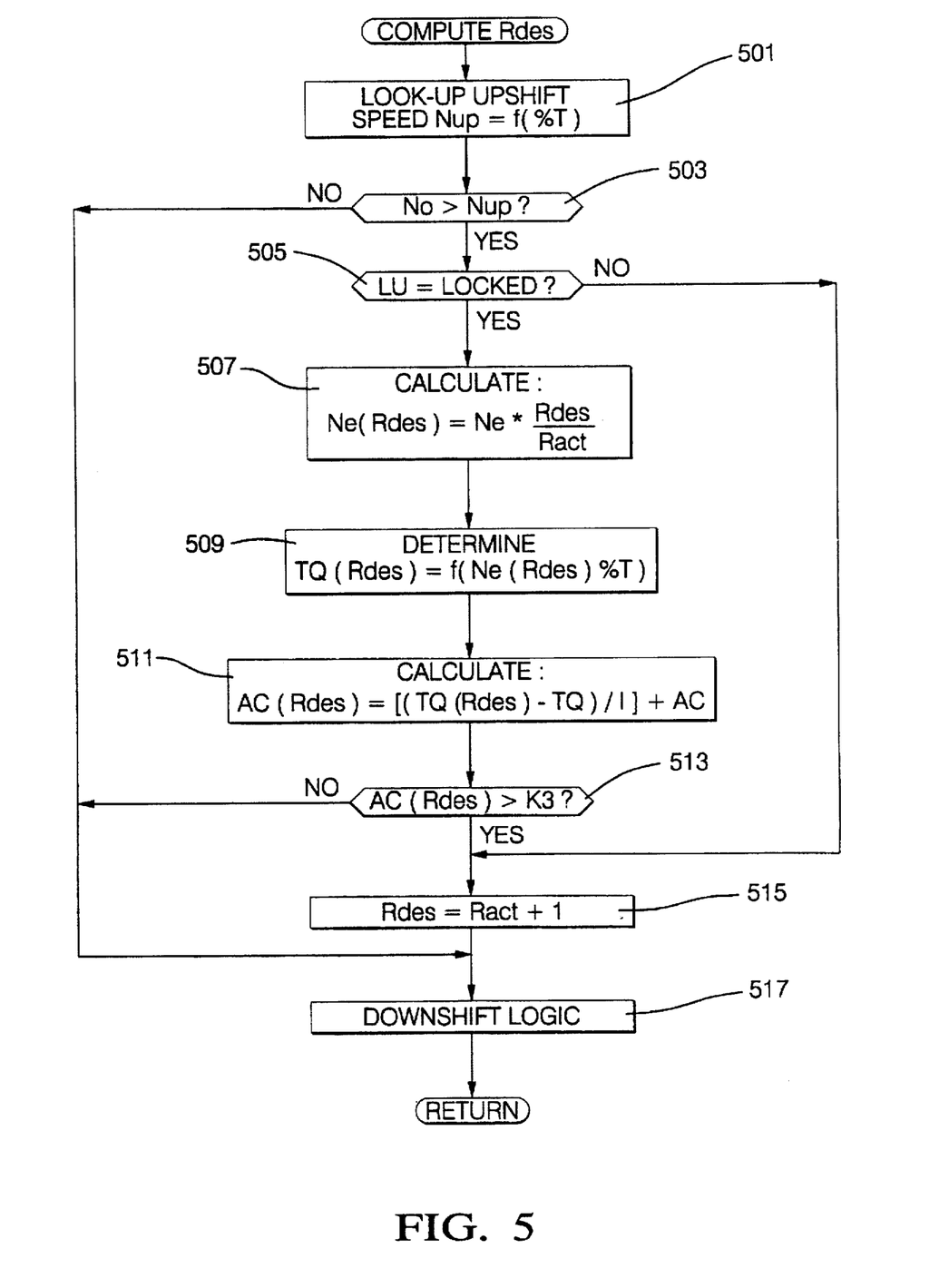
Figure 6:
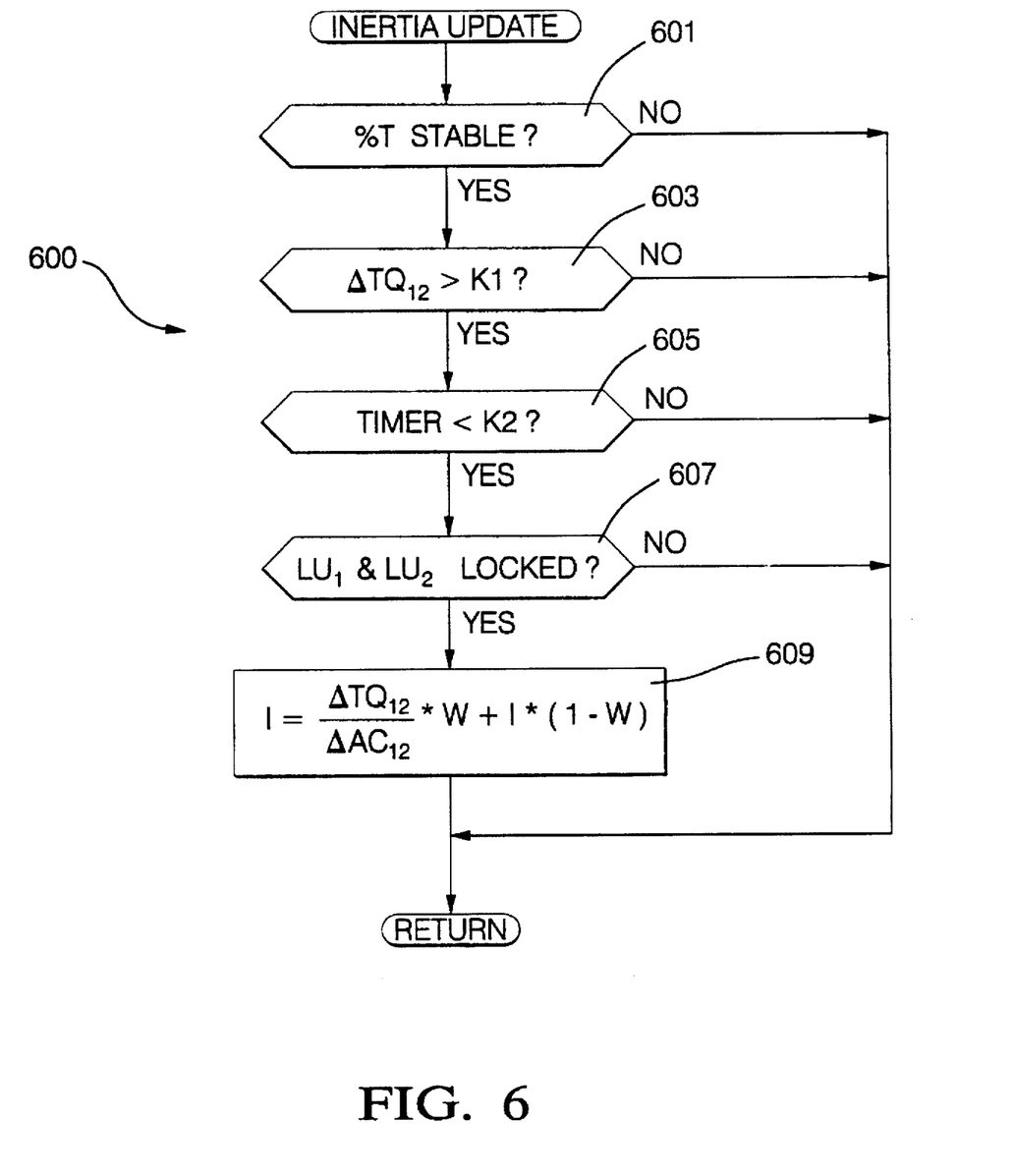

The steps represented by block 138 pertinent to the present invention are detailed in the flow diagrams of FIGS. 4–6. With reference first to FIG. 4, the desired speed ratio Rdes is determined <401> as detailed in the steps of FIG. 5. Rdes is determined as a function of a number of factors including the current or actual speed ratio Ract, the output speed No, the throttle position %T, and the position of the manual valve which in a forward range may limit the availability of the lowest speed ratios. In addition to such considerations, the routine detailed in FIG. 5 provides for bypass of an otherwise acceptable upshift if it determines that predetermined acceleration criteria are not met in accord with the present invention.

Blocks <405>–<409> generally depict steps executed when a shift is not in progress while blocks <410>–<417> depict steps executed when a shift is in various stages of progression. Once the desired speed ratio Rdes has been determined, decision block <403> determines if the actual speed ratio Ract is equivalent to the desired speed ratio Rdes. Ract is determined as the ratio of turbine speed Nt to output speed No or (Nt/No). Equivalency of Ract and Rdes may be determined when Ract is within a predefined tolerance band of Rdes, such as within 20% of Rdes for example, for a number of consecutive loops or for a predetermined amount of time.

Taking first the situation wherein Ract is not equivalent to Rdes, decision block <410> determines which one of an upshift or downshift is underway. If Ract is less than Rdes then an upshift is underway and blocks <411>–<417> are executed. If, however, Ract is not less than Rdes then a downshift is in progress and the decision block <419> is executed. A downshift in the present embodiment is of no import to the present embodiment. Thus, a negative response at decision block <410> results in a status check of the progression of the downshift at decision block <419> such as by the state of a shift in progress flag. A downshift in its initial stage will result in a negative response to the query at block <419> and execution of initialization steps of block <417> for a downshift. Block <417> also sets the shift in progress flag such that future passes through the routine will bypass the initialization steps. Affirmative response at block <417> bypasses further processing respecting shift scheduling.

With reference back to decision block <410> and an affirmative answer thereto, processing passes to decision block <411> which determines whether an upshift is in progress beyond an initial stage. As with a downshift, an initial pass through the loop will find decision block <411> answered negatively and pass processing to block <413>, while subsequent passes will route processing to block <421> thus bypassing blocks <413>–<417>. Assuming an initial pass through the loop, blocks <413>–<417> are executed to save the transmission output torque TQ immediately preceding the upshift into register $TQ_1$, output shaft acceleration AC immediately preceding the upshift into register $AC_1$, and lock-up state of torque converter clutch LU immediately preceding the upshift to register $LU_1$ <413>. A shift duration timer is then initialized <415>. Shift parameters such as oncoming and offgoing clutch pressures, clutch fill time, and timers are then initialized and a shift in progress flag is set to ensure future passes through the routine will bypass the initialization steps.

Referring back to decision block <411>, future passes through the loop will be recognized such as by the set shift in progress flag and execute an increment of the shift timer <421>.

For so long as the upshift progresses and Ract does not equal Rdes, the previously described blocks <410>, <411> and <421> will be executed. Decision block <403> being answered affirmatively, however, will allow execution of blocks <405>–<409>. If an upshift has not just been completed <405>, steps <407> and <409> are bypassed. This may be the result of steady state operation in Ract or completion of a downshift which, as mentioned, is not of import in the present embodiment. An upshift having just been completed, however, saves the transmission output torque TQ immediately subsequent the upshift into register $TQ_2$, output shaft acceleration AC immediately subsequent the upshift into register $AC_2$, and lock-up state of torque converter clutch LU immediately subsequent the upshift into register $LU_2$ <407>. This is followed by execution of the steps represented by block <409> for update of the output inertia as detailed in the flow diagram of FIG. 6.

Figure 2:
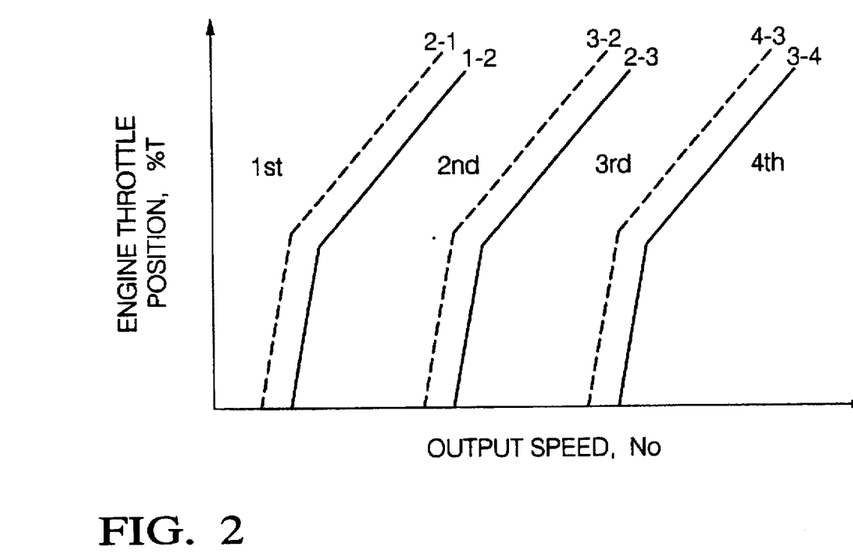
FIG. 2 is an exemplary shift pattern of a load based shift scheduling system as implemented by a controller as shown in FIG. 1.

Referring now to the flow diagram of FIG. 5, program steps detailing the computation of the desired speed ratio Rdes <401> as part of the shift scheduling routine of FIG. 4 are shown. First a conventional table look-up is performed to determine a threshold output speed as a function of throttle position for an upshift. The table look-up is performed in accord with the present speed ratio Rdes and is graphically depicted as output speed No versus throttle position %T in FIG. 2. The output speed threshold Nup is returned and compared with the actual output speed No <503> to determine if an upshift is indicated by the present settings of %T and output speed No. Where actual output speed does not exceed the threshold Nup, block <517> is executed to perform similar functions for a downshift. However, assuming that No exceeds Nup, the lock-up state of the torque converter clutch is tested to determine if it is operating with fluidic coupling (un-locked) or with mechanical coupling (lock-up). An un-locked condition is sufficient to bypass further processing in accord with the present invention. Operation in an un-locked mode would tend to work to the advantage in an upshift situation which may require higher levels of input torque by way of the torque multiplication factor afforded by the fluidic coupling therethrough. Therefore, for purposes of the present exemplary embodiment, fluidic operation results in setting the desired ratio Rdes to the next ratio relative the actual ratio Ract <515>.

Proceeding from block <505> with the assumption that the torque converter clutch is operative in a lock-up mode, blocks <507>–<511> are next sequentially executed in furtherance of calculating the output inertia in accord with the present invention. Block <507> first projects what the engine speed Ne(Rdes) will be after completion of an upshift from the current ratio Ract to the desired ratio Rdes. This calculation assumes a substantially equivalent output speed for the different engine speeds which is the case across a normal shift. Output torque in the next ratio TQ(Rdes) is then projected as a function of the projected engine speed Ne(Rdes) and current throttle position %T. Preferably, TQ(Rdes) is returned from empirically determined data stored in a two-dimensional look-up table where Ne(Rdes) and %T are independent variables. Utilization of the present value of %T provides for a relatively conservative implementation of a projected output torque TQ(Rdes). Alternatively, a maximum throttle may be substituted for %T as the look-up variable to reflect an available or maximum output torque TQ(Rdes). Next, a predicted output acceleration AC(Rdes) is developed from the predicted output torque TQ(Rdes), present output torque, present output acceleration AC and predetermined output inertia I as determined with respect to instructions detailed in the flow diagram of FIG. 6 as called by block <409> of the flow diagram of FIG. 4.

Decision block <513> next in execution sequence compares the predicted acceleration AC(Rdes) in the upshift ratio Rdes to a calibration value K3 which is set in accordance with desired performance objectives. Failure of AC(Rdes) to exceed the calibration value K3 results in bypassing block <515> and foregoing an upshift. Where AC(Rdes) exceeds the calibration value K3, sufficient capability in the upshift ratio Rdes is deemed and the desired ratio Rdes is set to the next speed ratio in accordance with an upshift from the present speed ratio Ract. The routine is exited through the downshift logic <517>.

Reference is now made to the routine of FIG. 6 which updates the output inertia as called for upon the completion of an upshift in accord with the present invention. A series of entry conditions is checked by sequentially executed decision blocks generally designated 600 in the figure. Recalling that the inertia update is caused to occur upon completion of an upshift, the stability of the throttle %T through the shift is checked. Substantial throttle excursions, both in duration and magnitude, may result in undesirable inaccuracies of calculated inertia and thus will cause bypassing of the remaining blocks. Similarly, insubstantial output torque differentials $\Delta TQ_{12}$ as measured across the upshift from $TQ_1$ and $TQ_2$, may result in undesirable inaccuracies of calculated inertia and similarly result in bypassing such calculation. The shift duration as measured by the time initiated at the inception of the upshift is excessive will similarly result in bypass of the inertia calculation as the probability of undesirable differentials in temporal influences upon the vehicle increases with shift duration. Finally, the lock-up state of the torque converter clutch is checked for the desirable condition of lock-up both prior to and subsequent the upshift.

With all such entry conditions satisfied, the output inertia is updated from historical values of similarly calculated inertias and an inertia value for the present upshift event. The ratio of output torque difference as measured across the upshift as $\Delta TQ_{12}$ from the individual saved values of output torques $TQ_1$ and $TQ_2$ to output acceleration difference also as measured across the upshift as $\Delta AC_{12}$ from the individual saved values of output accelerations $AC_1$ and $AC_2$ established the present measure of output inertia. The ratio as shown is multiplied by a filter gain constant W between zero and unity. The historical value for output inertia is multiplied by the unit complement (1−W) of the filter gain constant W and then added to the gained ratio to provide an updated, filtered value for the output inertia I.

While the present invention has been described in detail with respect to a preferred embodiment, such description is to be understood to be taken by way of non-limiting example. Alternatives implementations within the realm of the invention as herein described will be recognized by those skilled in the art. It is intended therefore that the scope of the invention be limited only by the claims appended hereto.

I claim:

1. A method of transmission shift control in a motor vehicle having an internal combustion engine for producing output torque at an engine output member, the engine output member coupled to an input member of an automatic multi-ratio transmission having shift scheduling normally determined in accordance with a predetermined load based shift schedule to establish the ratio between the transmission input member and a transmission output member, the method comprising:

calculating a moment of inertia at the transmission output member from respective sets of transmission output member parameters determined prior to and after a ratio change;

adapting shift scheduling as a predetermined function of the moment of inertia; and establishing the ratio between the transmission input member and the transmission output member in accordance with the adapted shift schedule.

2. The method of transmission shift control as claimed in claim 1 wherein the step of adapting shift scheduling includes the steps of predicting a transmission output member acceleration for a predetermined ratio as a function of the moment of inertia, and inhibiting engagement of the predetermined ratio when the predicted acceleration is less than a predetermined desired acceleration in the predetermined ratio.

3. A method of transmission shift control in a motor vehicle having an internal combustion engine for producing output torque at an engine output member, the engine output member coupled to an input member of an automatic multi-ratio transmission having shift scheduling normally determined in accordance with a predetermined load based shift schedule to establish the ratio between the transmission input member and a transmission output member, the method comprising:

determining a first acceleration of the transmission output member immediately preceding a ratio change;

determining a first output torque of the transmission output member substantially contemporaneously with the determination of said first acceleration;

determining a second acceleration of the transmission output member immediately subsequent the ratio change;

determining a second output torque of the transmission output member substantially contemporaneously with said second acceleration;

calculating a moment of inertia at the transmission output member as a predetermined function of the first and second accelerations and the first and second torques;

adapting shift scheduling as a predetermined function of the moment of inertia; and establishing the ratio between the transmission input member and the transmission output member in accordance with the adapted shift schedule.

4. The method of transmission shift control as claimed in claim 3 wherein the step of calculating the moment if inertia includes taking the ratio of respective differences between the first and second torques and accelerations.

5. The method of transmission shift control as claimed in claim 3 wherein the step of adapting shift scheduling includes the steps of predicting a transmission output member acceleration for a predetermined ratio as a function of the moment of inertia, and inhibiting engagement of the predetermined ratio when the predicted acceleration is less than a predetermined desired acceleration in the predetermined ratio.

6. A method of transmission shift control in a motor vehicle having an internal combustion engine for producing output torque at an engine output member, the engine output member coupled to an input member of an automatic multi-ratio transmission for selectively performing ratio changes in accordance with a predetermined load based shift schedule to establish the ratio between the transmission input member and a transmission output member, the method comprising:

performing a ratio change;

determining a transmission output torque differential ascertained across the ratio change;

determining a transmission output acceleration differential ascertained across the ratio change;

calculating a moment of inertia at the transmission output member as a predetermined function of the output torque and acceleration differentials;

adapting shift scheduling as a predetermined function of the moment of inertia; and establishing the ratio between the transmission input member and the transmission output member in accordance with the adapted shift schedule.

7. The method of transmission shift control as claimed in claim 6 wherein the step of calculating the moment of inertia includes taking the ratio of the torque differential and acceleration differential.

8. The method of transmission shift control as claimed in claim 6 wherein the step of adapting shift scheduling includes the steps of predicting a transmission output member acceleration for a predetermined ratio as a function of the moment of inertia, and inhibiting engagement of the predetermined ratio when the predicted acceleration is less than a predetermined desired acceleration in the predetermined ratio.

* * * * *